United States Patent [19]

McCormick et al.

[11] 4,078,413
[45] Mar. 14, 1978

[54] APPARATUS FOR PRODUCING FIBERS FROM HEAT-SOFTENABLE MATERIALS

[75] Inventors: Ronald O. McCormick, Columbus; Robert O. Slonaker, Pataskala, both of Ohio

[73] Assignee: Owens-Corning Fiberglas Corporation, Toledo, Ohio

[21] Appl. No.: 659,874

[22] Filed: Feb. 20, 1976

Related U.S. Application Data

[60] Division of Ser. No. 550,480, Feb. 18, 1975, Pat. No. 3,972,702, which is a continuation of Ser. No. 384,163, Jul. 30, 1973, abandoned.

[51] Int. Cl.² .............................................. B21D 22/00
[52] U.S. Cl. ........................................ 72/343; 72/469; 72/474
[58] Field of Search ................. 72/343, 350, 351, 273, 72/474, 412, 469

[56] References Cited

U.S. PATENT DOCUMENTS

| 570,063 | 10/1898 | Schuler | 72/350 |
| 2,136,240 | 11/1938 | Ernst | 72/351 |
| 2,698,268 | 12/1954 | Lyon | 72/350 X |
| 3,344,646 | 10/1967 | Moller | 72/348 |

*Primary Examiner*—Leon Gilden
*Attorney, Agent, or Firm*—John W. Overman; Ronald C. Hudgens; Kenneth H. Wetmore

[57] ABSTRACT

A stream feeder for supply of streams of molten glass for attenuation into fibers. The feeder is formed of metal and is electric-resistance heated. The bottom wall and sidewalls of the feeder are of varied thickness and are formed from a single sheet of metal. The disclosure also includes method and apparatus for forming the bottom wall and varied thickness sidewalls from a single sheet of metal.

4 Claims, 11 Drawing Figures

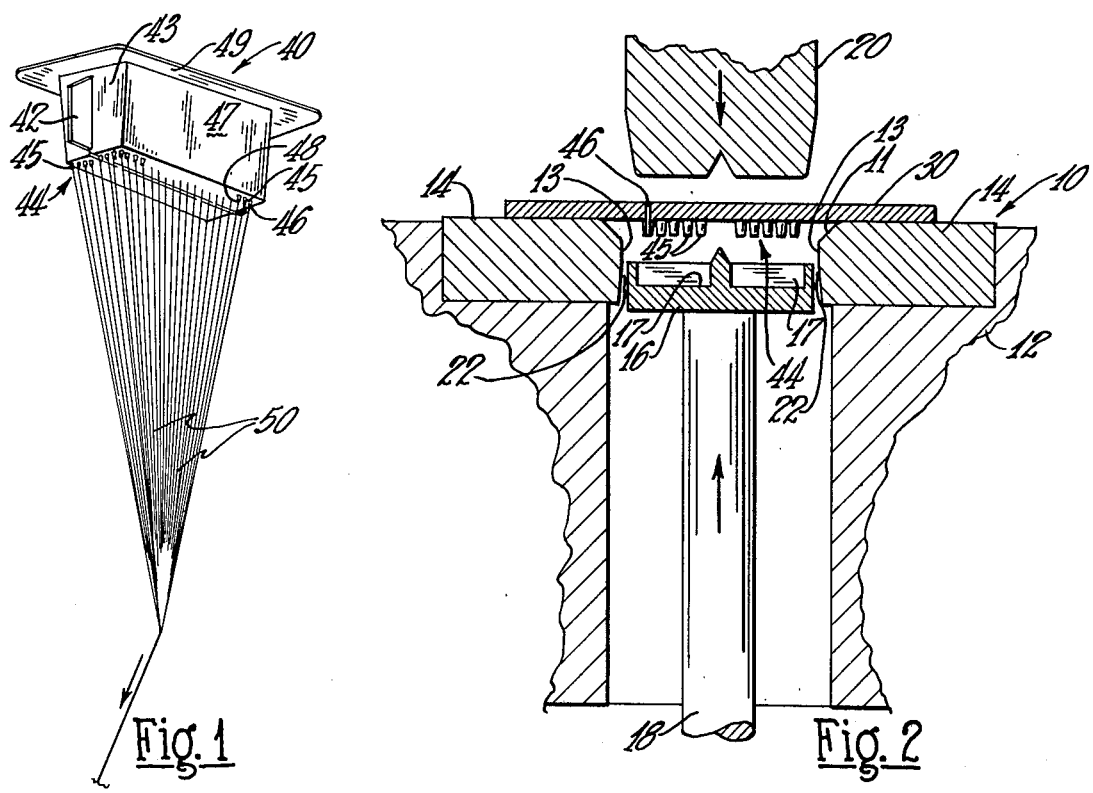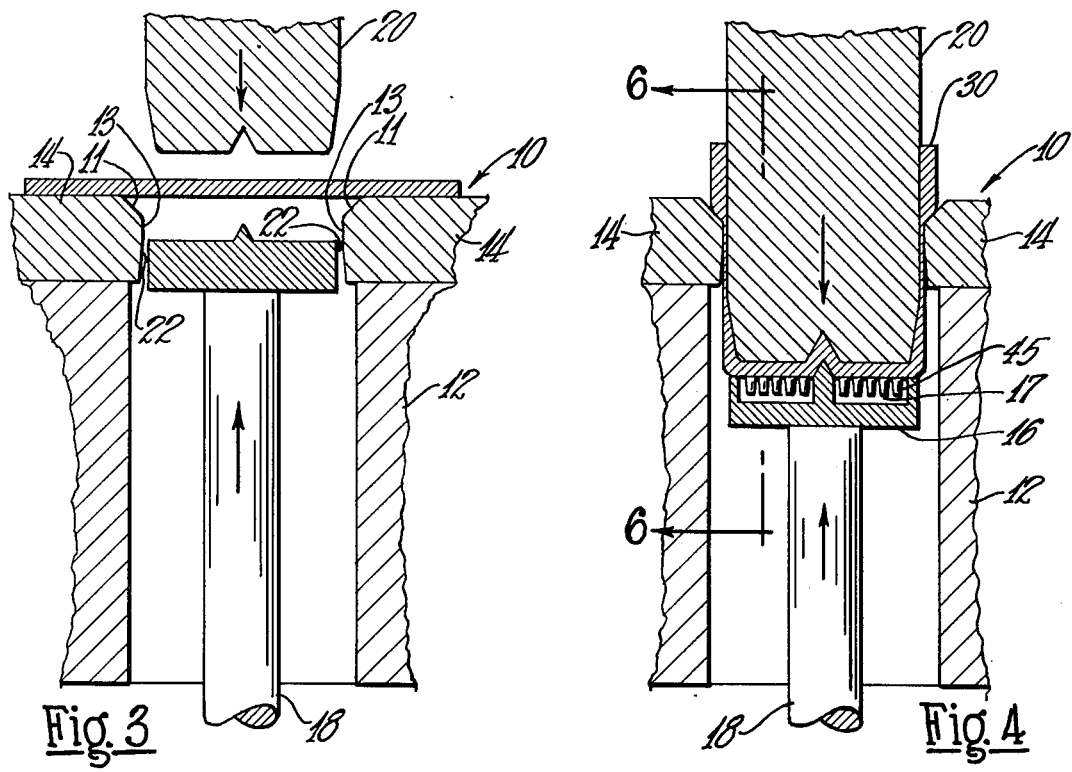

APPARATUS FOR PRODUCING FIBERS FROM HEAT-SOFTENABLE MATERIALS

This is a division of application Ser. No. 550,484, filed Feb. 18, 1975 now U.S. Pat. No. 3,972,702, which is a continuation of application Ser. No. 384,163, filed July 30, 1973, now abandoned.

BACKGROUND OF THE INVENTION

This invention relates to apparatus for melting heat-softenable materials and more particularly to stream feeders or bushings made of platinum, rhodium or other precious metal alloys for producing continuous glass fibers and to a method of fabricating stream feeders from such metals.

Several methods have heretofore been employed in processing glass for forming continuous glass filaments or fibers. One method involves the steps of melting glass in a comparatively large furnace, refining the glass in a refining chamber, and forming the glass into spherical bodies or marbles. The glass marbles are subsequently delivered into a stream feeder which is electrically heated to remelt the glass to a viscosity at which the streams of glass may be flowed through orifices in the feeder and attenuated into fibers.

The more common method used today is the direct melt process wherein glass batch is reduced to a molten state and refined in a furance. The molten glass flows from the furnace along a forehearth channel to stream feeders disposed along the forehearth. The feeders are heated by electrical resistance heating to control glass viscosity. And the streams of the glass are delivered through orifices in the feeders or bushings for attenuation into fibers.

Both of the above fiber forming processes employ stream feeders or bushings made of high temperature resistant metal alloys such as platinum or rhodium. The stream feeder is a long metal box having orificed tips or projections attached to its bottom wall through which streams of glass flow for attenuation into fibers. Terminals to which electrical bus bars are attached for supply of current through the feeder are welded to either end of the box-shaped feeder. The feeder is then heated by its own electrical resistance. To achieve the desired heating characteristics in the feeder, it has conventionally been the practice to vary the thickness of the feeder walls to control the amount of current passing therethrough.

Feeders have typically been manufactured from pre-cut parts which are welded together by conventional fusion welding techniques. The plate for the bottom wall or tip section is usually of uniform thickness and the plates for the sides and flanges are of various lesser thicknesses to produce the desired heat pattern and/or to reduce the amount of precious metal required. Using thinner pieces for the side walls and flanges causes several difficulties in conventional feeder fabrication as well as feeder performance. For example, additional rolling of the thinner sections is require. The welding together of the pieces is time consuming and the uniformity of the welds may vary. Also, because of the cast nature of the fusion bead as compared to the wrought sheet, resistivity is changed through the weld zone and the same heat pattern may be difficult to stabilize or reproduce from feeder to feeder. Severe warpage of the thinner sheet material may occur when fusion welded to the thicker material. In addition, if the welds are not made extremely carefully, they may leak glass. Also, if failures or fractures occur in the feeders, they usually occur in or ajacent to the welds.

If a technique could be developed for reducing the adverse effects of fusion welding during construction of the feeders or for improving current distribution through the feeder when it is in operation, a substantial contribution would be made to advance the art of forming high-temperature continuous fibers.

SUMMARY OF THE INVENTION

Accordingly, it is an important object of the present invention to provide feeders for heat softenable fiber-forming materials that have predetermined and controlled current carrying and resistance heating characteristics.

Another object is to provide glass stream feeders that are formed with a minimum of welding.

A still further object is to provide a method for fabricating feeders for high temperature heat softenable fiber forming materials that involves minimizing welds and yet retains the necessary varied wall thickness for controlling the resistance-heating of the feeders.

The present invention accomplishes the above objectives by fabricating the feeder tip section, sidewalls and flanges from one piece of precious metal plate. A plate of the same thickness as the desired tip section, but somewhat wider, is centrally positioned over a rectangular opening or die formed by two spaced apart, ironing inserts held in a solid retainer block. A tapered punch or ram presses the plate downwardly between the surface of the inserts and the ram surface under controlled conditions to compress and draw the thick plate to form thinner sidewalls. Successive passes of various sizes of punches or inserts may be used to compressively iron the side walls to the desired taper and thickness. After the part is formed to the desired cross-sectional shape, the flanges and perhaps end plates can be formed and trimmed by hand or by conventional die-set methods.

The operational advantages of using this method to form feeders includes better or more stable control of feeder wall thickness, fewer weld lines, greater flexibility in feeder design, increased feeder strength and increased average feeder life. The fabrication advantages include reduced fabrication time, reduce inventory of precious metals, consistent dimensional characteristics, reduced rolling, stock cutting and layout and reduced skill needed to fabricate the feeders.

Other advantages and features of this invention will appear in the following description and appended claims reference being had to the accompanying drawings wherein like reference characters designate corresponding parts in the several views.

DESCRIPTION OF THE DRAWINGS

FIG. 1 is a generalized isometric view of apparatus for producing continuous glass fibers utilizing a resistance heated molten glass feeder made of metal;

FIG. 2 is a front elevation view with parts in section of the punch and drawing apparatus of the present invention;

FIG. 3 is a front elevational view similar to FIG. 2 showing another embodiment of the invention.

FIG. 4 is a front elevational view with parts in section of one step in the use of the apparatus shown in FIG. 2

DESCRIPTION OF THE PREFERRED EMBODIMENTS

Figure 6:
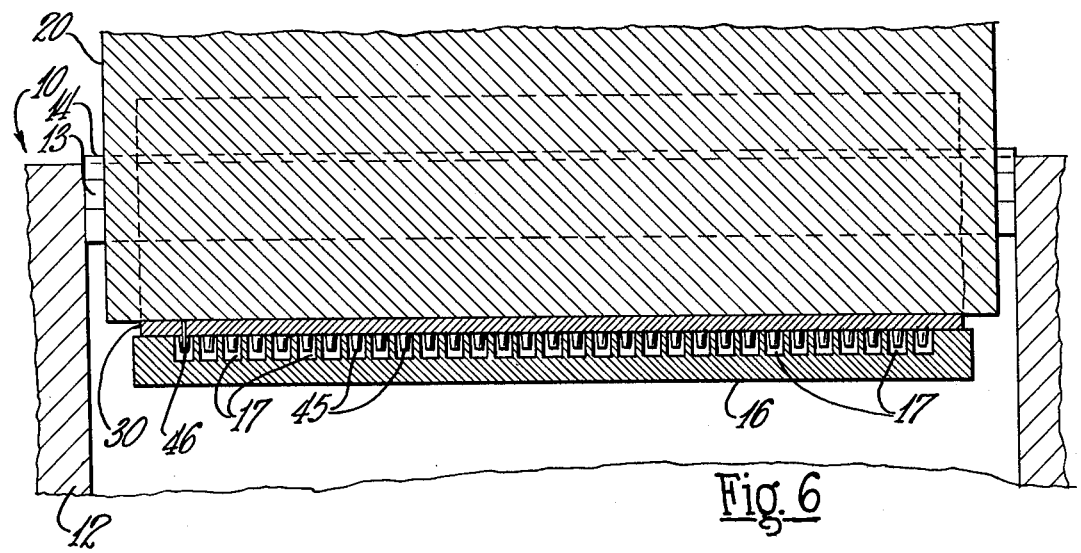
FIG. 6 is a cross sectional view taken substantially along line 6—6 of FIG. 4.

Before explaining the present invention in detail it is to be understood that the invention is not limited in its application to the details of construction and arrangement of parts illustrated in the accompanying drawings, since the invention is capable of other embodiments and to being practiced or carried out in various ways to produce elements for other end uses. Alos it is to be understood that the phraseology or terminology employed herein is for the purpose of description and not of limitation.

As shown in FIG. 1, continuous glass fibers are formed utilizing a stream feeder or bushing 40 provided with electrical terminals 42 to which electric lines (not shown) are connected. Electric current is supplied from a source and is passed through the feeder to heat the same by its own electrical resistance. An insulating refractory (not shown) is typically provided around the bushing to retain heat and improved efficiency.

Glass fiber forming material in the form of molten glass is fed by gravity into the feeder 40 from a forehearth connected to a glass melting furnace (not shown). In the feeder the molten material is further conditioned or heated and discharged downwardly as small molten streams 48 from orifices 46 formed in aligned array along the bottom of the feeder. This bottom orificed plate is generally referred to as the tip section 44 since the orific are usually formed in projecting tips 45. The streams are attenuated into fibers 50 by a tension device such as winder, pull wheel or blower (not shown). Then the fibers may be lubricated by a liquid sizing or binder and pulled or conveyed to a conventional collection device.

The stream feeder or bushing 40 is basically a specially shaped box made of high temperature resistant alloys such as platinum, rhodium or the like. It has been a practice to fabricate the feeders using precut metal strips manually welded together. As previously stated, the welding process requires skilled labor and the welds even if accurately executed may cause feeder operating problems. The present invention minimizes the number of welds required in feeder fabrication and maintains the variable wall thickness needed for optimum operation of the feeder.

The apparatus used for fabricating glass stream feeders in accordance with the present invention is illustrated in FIGS. 2 - 6. It comprises modified forms of apparatus sometimes used by the drawing industry when deep drawing cans or pressure vessels. The apparatus includes a ram or male portion 20 and a die or female portion 10. The ram 20 is a tapered rectangular member designed to be passed through the larger rectangular opening formed by the die 10. The die 10 includes a heavy duty retainer block 12 with removable ironing or pressing inserts 14 set therein to form the female portion of the system. A tip nest or support plate 16 is connected by means of a rod 18 to a hydraulic or air cushion means (not shown). The tip plate nest or support 16 is designed to move freely up and down within the rectangular opening formed by the inserts 14 and the retainer block 12. The support 16 applies resistive pressure to the bottom of the plate 30 to be formed. Thus, the support 16 helps to hold the plate 30 and stabilize the process.

Figure 5:
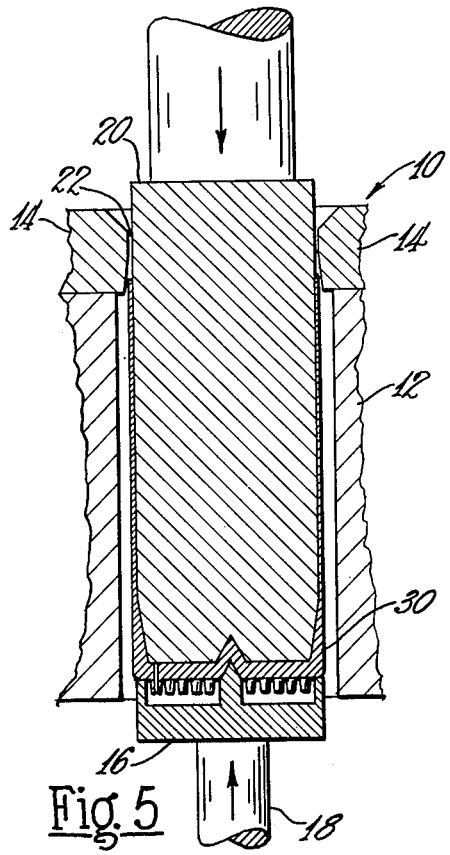
FIG. 5 is a front elevational view similar to FIGS. 2 and 4 illustrating another step in the use of the invention.

FIGS. 2, 4 and 5 illustrate the progressive steps of forming a glass stream feeder of the present invention. The metal plate 30 from which the feeder 40 is to be formed is properly rolled, cut to size and annealed. The prepared plate 30 is formed to the thickness of the desired tip section 44. Projections or tips 45 are fused to the plate and holes 46 are drilled through the plate and projections by a technique similar to that disclosed in U.S. Pat. No. 3,598,952. Other methods for forming or attaching the projections which can also be used are described in U.S. Pat. Nos. 3,514,841 and 2,933,950. The main advantage of forming the tips 45 at this point in the fabrication process is the ease of attachment because the flat rectangular plate 30 is more easily indexed in an automated process than an already formed box-shaped feeder. However if desired, it is also possible with this invention to form the feeder to its final shape before adding the tips 45 and providing the orifices 46. FIG. 3 shows such a plain flat plate being readied for forming.

Once the plate 30 is ready with the attached orificed tips 45, it is placed over the rectangular opening of the die 10. Fixtures (not shown) may be used to help assure proper positioning of the plate. The tip nest and support 16 is brought into contact with the bottom of the plate 30. As shown in FIG. 6, slots 17 are provided in the support 16 to form a tip nest which accommodates the rows of tips 45 and yet provides support for the plate.

The ram 20 is lowered into contact with the top of the plate 30 and pressure is applied to both sides of the plate by the ram 20 on one side and the support 16 on the other side. The hydraulic or air cushion means of the support or tip nest 16 provides a pneumatic force which resists the force of the ram by a predetermined amount. The opposing forces of the ram and support act to hold the plate firmly between the ram and support plate and isolate the stress in one sidewall 47 from the other. It has been found that a constant resistance or back-up pressure of four to five tons against the support 16 is sufficient to securely hold the plate 30 and keep it in a stable position for the pressing of the metal which follows in later process steps.

Once the plate is securely held, the pressure on the ram or punch 20 is increased to overcome the resistance force of the support 16 and move and compress the thick plate 30 by passing it through the confined opening 22 that is formed between the tapered surface of the ram and the pressing surface 13 of the inserts 14. The space or clearance 22 varies because the ram is tapered. As the ram moves relative to the die opening the thick plate is forced or urged between the tapered ram and the die inserts and is compressively ironed to a reduced thickness filling the clearance space 22.

Because the plate 30 is being compressively ironed between the ram and the ironing or pressing inserts 14, substantial frictional resistance is built up between the inserts and the metal plate. However, most of this force is directed against the inserts. It has been found that a pressure of only 50 tons on the ram is enough to compressively form and reduce the plate in thickness from 40 to 50 percent.

Great compressive and frictional forces are exerted on the inserts. Therefore, the retainer block 12 and the inserts 14 must be sufficiently strong to resist deformation. Also, the insert material must be sufficiently hard and smooth so that the plate metal is not galled or otherwise damaged. An insert having a hardness of about 45 to 50 on the Rockwell C scale has been used successfully in the operation of this invention.

The resistance between plate metal and insert is also reduced by using an extreme pressure type lubricant to avoid metal to metal contact.

Figure 7:
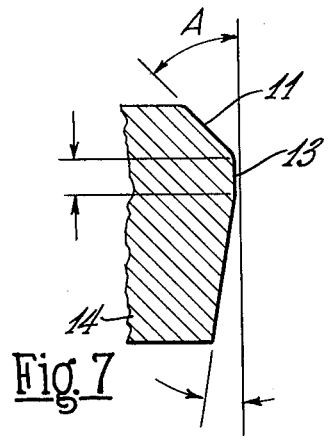
FIG. 7 is an enlarged sectional view of the pressing member shown in FIG. 2.
Figure 8:
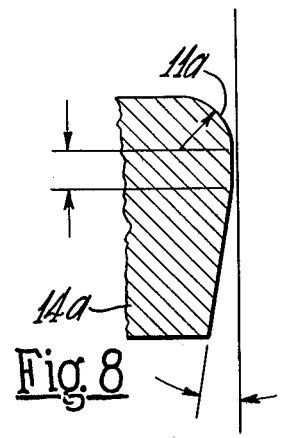
FIG. 8 is an enlarged sectional view similar to FIG. 7 showing another embodiment of the pressing member.

Another feature of the apparatus is the shape and size of the inserts. The corners or shoulders 11 of the inserts 14 are rounded to allow the plate to be fed or urged more easily into the clearance 22 between the ram and inserts. The opening formed by the shoulder must necessarily be wider than the initial thickness of metal being driven therethrough. FIG. 7 shows the beveled form of the shoulder portion 11 of the pressing surface. In this embodiment the corner 11 has been cut off at a 45° angle A. An angle in the range of 30° to 60° should be satisfactory depending upon the metal to be formed. If the angle A is less than 30° the opening leading to the pressing surface 24 is longer and narrower and may cause detrimental frictional forces between the surfaces. If the angle A is greater than 60° the shoulder surface may act to cut or peel back the metal rather than feed it between the surfaces to be pressed. Also, all exposed corners that may come in contact with the metal plate are rounded to likewise avoid damage to the plate. FIG. 8 shows a form using a rounded greater than the original thickness of the metal plate 30 to assure smoother feed of the metal between the surface of the pressing inserts 14a and the ram 20.

Each shoulder 11 of the insert 14 provides a gradually diminishing dimension in the region of the entrance to assist the compression of the metal plate 30 between the pressure applying surface of the ram 20 and the ironing surface 13 of the die inserts 14. By providing a converging region for application of pressure the rounded shoulder or inlet 11 helps to urge the thick metal plate 30 between the thinner space between the ram 20 and the lands 13 of the inserts. 14.

The lands or pressing surfaces 13 are the raised portions on the inserts 14 which do the actual pressing of the plate metal to its desired thickness. Shims (not shown) may be positioned between the inserts and the retainer block to obtain the desired clearance. The lands 13 are maintained as small as possible to reduce the frictional forces. Lands as small as one-quarter inch wide have been used successfully. However, it may be possible to reduce the area of the lands even more.

As pressure exceeding the resistance force of the support 16 is applied to the ram, the plate is forced between the ram 20 and the lands 13 of the insert 14 and the plate is compressively ironed to the desired thickness. The change in shape of the plate 30 is not like conventional drawing. In conventional drawing processes a constant wall thickness is desired. Ideally, the plate changes shape but not thickness. Therefore, there is always a reduction in diameter or length and width of the part in one direction as well as an increase in height or width in another direction. When a change in thickness does occur, it is uncontrolled and may result in fracture of the part. The increase in height is almost totally dependent on the amount of reduction in another direction. Conversely for the compressive ironing in this invention, a change in thickness or tapering of the wall is desired. The diameter or the width of the plate is not effectively changed. The increase in height of the feeder walls is totally dependent upon the amount of cross-sectional reduction in thickness.

The amount of taper of the plate is controlled mainly by the shape or taper of the ram. The ram shown in FIGS. 2, 3 and 5 is uniformly tapered. And, therefore, the feeder wall made therefrom is thicker at the bottom tapering uniformly to a thinner cross-sectional area near the top. This taper approximates the feeder wall shape conventionally used.

Figure 9:
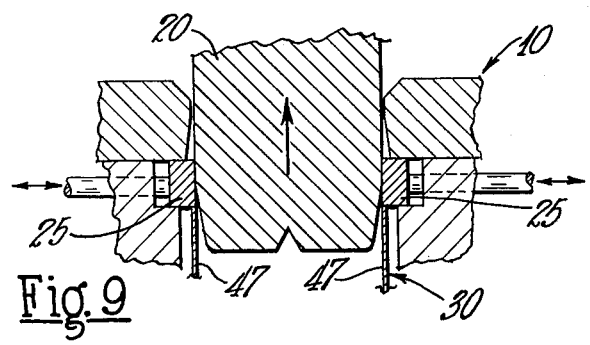
FIG. 9 is a cross sectional view similar to FIG. 2 illustrating release means for the invention.

To remove the formed plate 30 from the die 10 it has been found that the formed plate should be pushed completely past the lands 13 as shown in FIG. 5. Because the inside walls of the pressing inserts diverge from the narrower lands, the pressure on the sidewalls 47 of the formed plate 30 is released and the ram can be more easily removed. FIG. 9 illustrates an embodiment of the invention which provides means for aiding in the release of the part. As shown, wiper blades 25 may be inserted from their retracted position in the retainer blocks 12 to restrain the formed plate 30 and aid withdrawal of the ram 20 therefrom.

Once the ram is withdrawn, the hydraulic system of the support or tip nest 16 may be activated and the formed part pushed upwardly and out of the die 10. Alternatively, if the formed plate is not easily ejected upwardly from the die, the support plate 16 may be retracted further than that shown in FIG. 5 and the part removed from an open end of the die 10 or from beneath the die.

Prior to forming the plate 30 into a feeder 40 it may be necessary to anneal the plate. The type or degree of annealing depends upon the reduction in the cross-section of thickness per pass and the type of alloy composition used. It has been found that for an alloy comprised mainly of platinum and rhodium that an annealing of ten minutes at 1850° F. followed by a ten minute cooling period yields a plate having sufficient tensile strength to avoid tearing yet ductile enough to go through the forming operation without fracture. The forming process of the invention also promotes grain growth in a different direction than that normally encountered with prior rolling and feeder fabrication methods.

Figure 10:
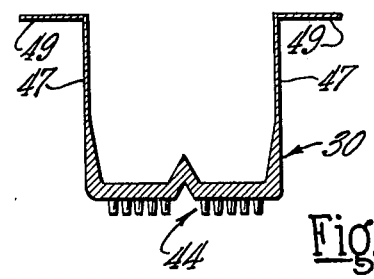
FIG. 10 is a sectional view of apparatus made by the invention.
Figure 11:
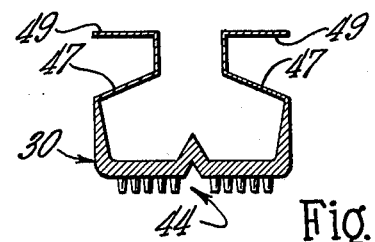
FIG. 11 is a sectional view similar to FIG. 10 illustrating another form of the apparatus made by the invention.

FIGS. 10 and 11 illustrate completed forms of the unitary bottom wall 44 and side walls 47 of the present invention. The change in thickness illustrated was attained by passing the metal through the compressing and forming apparatus at least two times. However, for some feeder designs or alloy compositions one pass may be sufficient. Once the plate is compressed to its predetermined thicknesses, the side walls 47 and flanges 49 are bent and formed by conventional metal working techniques to the final shape such as shown in FIG. 11. Thereafter the thicker end plates 43, electric terminals 42 and other necessary parts are attached by conventional fusion bonding techniques.

The present invention does not eliminate all the welds in a feeder but does eliminate a major portion of them. Of special significance is the elimination of the long welds that heretofore were necessary for attachment of the tip plate or bottom wall 44 to the feeder sidewalls 47 and for connection of the upper and thinner sidewall portions to the lower and thicker sidewall portions.

One of the most important features of the invention is that for a particular feeder design, the bottom wall 44 and sidewalls 47 can be made more nearly identical. There is less variation of the type previously caused by differences in welding machines or in the ability of the personnel fabricating the feeders.

Although the invention has been described with regard to platinum-rhodium alloys, it will be evident that feeders in accordance with the present invention can be made from other ductile high temperature resistant metals.

It is apparent that, within the scope of the invention, modifications and different arrangements may be made other than as herein disclosed, and the present disclosure is illustrative merely, the invention comprehending all variations thereof. For example, many variations in the thickness of the feeder sidewalls are possible by using different shapes and sizes of punches and die inserts. Also, the plate 30 initially used may be rolled or formed to shapes other than the uniform thickness shown in FIGS. 2 and 3.

In addition, the contour of the ram 20 or pressing inserts 14 can be varied in the longitudinal direction from end to end. Heretofore, the feeder wall thickness has been varied mainly in the vertical direction; thickness variations along the length were too difficult to fabricate. Using the present invention variations in feeder sidewall thickness along the length are practical and reproducible. Thus for a particular feeder that operates characteristically hotter near its center portion, the ram and die can be modified to change the wall thickness in that typically hotter area, thereby making a feeder that operates with more uniform temperatures from end to end.

We claim:

1. Apparatus for forming a component of a resistance heated feeder having rows of orificed projections in the bottom wall for supply of molten streams of fiber forming mineral material wherein the generally planar sidewalls and the bottom wall are made from a single plate of ductile, electric current-conducting and high temperature resistant material, comprising:

a ram shaped to conform to the interior shape of the portion of the feeder component bounded by the side and bottom walls;

two spaced apart rigid members defining an opening, opposing linear pressing surfaces extending lengthwise of both sides of the opening, the opposing pressing surfaces each being a relatively narrow land, the surfaces defining the shortest distance between the spaced apart members;

means for disposing a plate of the ductile, high temperature resistant current conducting material having rows of orificed projections in its center portion between the ram and the opening;

means for moving the ram against the plate to force the ram and plate between the pressing surfaces thus urging the plate to move in a direction transverse to the linear pressing surfaces of the opening, the space between the ram and the pressing surfaces being such as to effect progressive compression of the sidewall portions of the plate between the surface of the ram and the pressing surface as the ram moves past the pressing surfaces to form the plate into the feeder component having generally planar sidewalls and a bottom wall from a single plate of material; and means for supporting a center portion of the plate on the side opposite the ram during movement of the ram against the plate, the support means including a slot adapted to receive the rows of orificed projection of the plate and means for resisting the force of the ram by a predetermined amount less than the force of the ram.

2. Apparatus for fabricating from metal plate stock, having projections in its center portion, a longitudinal channel member having a rectangular bottom wall with the projections and generally planar sidewalls, comprising:

ram means having a rectangularly end shaped to conform to the interior contour of the longitudinal member desired;

a rigid body having an aperture formed therein which is larger than the ram, the aperture having raised interior land portions defining a relatively narrow linear pressing surface;

means for positioning the ram over the aperture for passage of the ram through the aperture, the ram having a contour such that the clearance between the surface of the ram and the pressing surface of the aperture may vary as the ram is passed through the aperture and past the lands defining the pressing surface;

means for disposing a metal plate over the aperture and between the ram and the aperture;

means for moving the ram relative to the aperture such that the rectangularly shaped end of the ram moves against the plate so the ram and plate are forced through the aperture thereby urging the plate to move with the ram in a direction transverse to the pressing surface defined by the lands and urging the plate to bend around the ram to form generally planar sidewall portions and a rectangular bottom wall portion and further compressing the sidewall portions of the plate between the surface of the ram and the pressing surface to form a longitudinal member having sidewalls with wall thicknesses corresponding to the varied clearance between the ram and the lands; and means for supporting a center portion of the plate on the side opposite the ram during movement of the ram against the plate, the support means including a series of slots adapted to receive the projections of the plate and means for resisting the force of the ram by a predetermined amount less than the force of the ram.

3. Apparatus as described in claim 2, wherein: the ram is contoured such that the clearance between the surface of the ram and the pressing surface decreases as the ram is passed through the aperture and past the pressing surfaces.

4. Apparatus as described in claim 2, wherein: the lands are less than one-half of an inch wide.

* * * * *